US012301089B2

(12) United States Patent
Nelson (10) Patent No.: US 12,301,089 B2
(45) Date of Patent: May 13, 2025

(54) POWER SYSTEMS AND ENCLOSURES HAVING IMPROVED COOLING AIR FLOW

(71) Applicant: Illinois Tool Works Inc., Glenview, IL (US)

(72) Inventor: Jonathon Nelson, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 580 days.

(21) Appl. No.: 17/346,866

(22) Filed: Jun. 14, 2021

(65) Prior Publication Data

US 2022/0037961 A1 Feb. 3, 2022

Related U.S. Application Data

(60) Provisional application No. 63/059,653, filed on Jul. 31, 2020.

(51) Int. Cl.
*H02K 9/10* (2006.01)
*B23K 9/10* (2006.01)
(Continued)

(52) U.S. Cl.
CPC ............. *H02K 9/10* (2013.01); *B23K 9/1006* (2013.01); *B23K 9/32* (2013.01); *B23K 37/003* (2013.01); *F02B 63/044* (2013.01)

(58) Field of Classification Search
CPC ...... B23K 37/003; B23K 9/1006; B23K 9/32; F02B 63/044; H02K 5/207; H02K 9/10
See application file for complete search history.

(56) References Cited

U.S. PATENT DOCUMENTS 4,142,091 A * 2/1979 Biethan, Sr. ......... B23K 9/1006
361/695
9,474,185 B2 10/2016 Jochman
(Continued)

FOREIGN PATENT DOCUMENTS

CN 101312880 11/2008
CN 201292884 8/2009
(Continued)

OTHER PUBLICATIONS

Int'l Search Report and Written Opinion for Appln No. PCT/US2017/029655 dated Aug. 24, 2017 (15 pages).
(Continued)

*Primary Examiner* — Dana Ross
*Assistant Examiner* — James F Sims, III
(74) *Attorney, Agent, or Firm* — McAndrews, Held & Malloy, Ltd.

(57) ABSTRACT

Power systems and enclosures having improved cooling air flow are disclosed. In some examples, a power system includes an enclosure, a first air inlet, a first air routing path, and a second air routing path. The first air inlet is at a first location on an exterior of the enclosure to permit intake of air from the exterior of the enclosure to an interior of the enclosure. The first air routing path is defined by the enclosure and directs air from the first air inlet through a welding-type power supply and a compressor. The second air routing path is separate from the first air routing path and defined by the enclosure. The second air routing path directs the air from the first air inlet or a second air inlet through at least one of an engine or a generator.

20 Claims, 5 Drawing Sheets

(51) Int. Cl.
  *B23K 9/32*   (2006.01)
  *B23K 37/003*  (2025.01)
  *F02B 63/04*   (2006.01)

(56)          References Cited

U.S. PATENT DOCUMENTS

| | | |
|---|---|---|
| 10,371,039 B2 | 8/2019 | Jochman |
| 2006/0027547 A1 | 2/2006 | Silvestro |
| 2009/0159577 A1* | 6/2009 | Sommerfeld ............ H05H 1/36 |
| | | 219/121.55 |
| 2010/0012636 A1* | 1/2010 | Jochman ............ H05K 7/20145 |
| | | 219/133 |
| 2017/0034957 A1 | 2/2017 | Jochman |

FOREIGN PATENT DOCUMENTS

| | | |
|---|---|---|
| EP | 3124158 | 2/2017 |
| WO | 2008134182 | 11/2008 |
| WO | 2010050480 | 5/2010 |
| WO | 2012100635 | 8/2012 |
| WO | 2015048544 | 4/2015 |

OTHER PUBLICATIONS

International Bureau, "International Preliminary Report on Patentability," issued in connection with International Patent Application PCT/US2018/047469, issued Mar. 12, 2020, 8 pages.

\* cited by examiner

POWER SYSTEMS AND ENCLOSURES HAVING IMPROVED COOLING AIR FLOW

RELATED APPLICATIONS

The present application claims the benefit of U.S. Patent Application Ser. No. 63/059,653, filed Jul. 31, 2020, entitled "POWER SYSTEMS AND ENCLOSURES HAVING IMPROVED COOLING AIR FLOW." The entirety of U.S. Patent Application Ser. No. 63/059,653 is expressly incorporated herein by reference.

BACKGROUND

This disclosure is generally directed to engine-drive power systems and, more particularly, to power systems and enclosures having improved air flow.

Conventionally, engine-driven power systems (e.g., generators, air compressors, and/or welders) are contained within a metal enclosure that provides environmental protection for the equipment and provides a safety, sound, and aesthetic barrier for the operators. Many different types of enclosures have been used for conventional power systems. Conventional enclosures allow air to enter and exit the enclosure to cool the engine and/or generator components.

SUMMARY

Power systems and enclosures having improved air flow are disclosed, substantially as illustrated by and described in connection with at least one of the figures.

In some examples, a power system includes an enclosure, a first air inlet, a first air routing path, and a second air routing path. The first air inlet is at a first location on an exterior of the enclosure to permit intake of air from the exterior of the enclosure to an interior of the enclosure. The first air routing path is defined by the enclosure and directs air from the first air inlet through a welding-type power supply and a compressor. The second air routing path is separate from the first air routing path and defined by the enclosure. The second air routing path directs the air from the first air inlet or a second air inlet through at least one of an engine or a generator.

In some examples, a power system includes an enclosure, a first air inlet, a second air inlet, a first air routing path, and a second air routing path. The first air inlet is at a first location on an exterior of the enclosure to permit intake of air form the exterior of the enclosure to an interior of the enclosure. The second air inlet is at a second location different than the first location on the exterior of the enclosure to permit intake of air from the exterior of the enclosure to the interior of the enclosure. The first air routing path directs air from the first air inlet to a compressor and a welding-type power supply and the second air routing path directs air from the second air inlet to at least one of an engine, muffler, or a generator.

BRIEF DESCRIPTION OF THE DRAWINGS

The figures are not necessarily to scale. Where appropriate, similar or identical reference numbers are used to refer to similar or identical components.

DETAILED DESCRIPTION

Conventional power systems including multiple components such as an air compressor, generator, engine, and/or welding-type power supply generally require air flow through the power system to cool the various components. In many conventional power systems, air brought into the power system is first used to cool the engine and/or generator prior to being used to cool the compressor or used as inlet air into the compressor. In this way, the air used to cool the compressor or used as input to the compressor may be preheated (e.g., from dissipating heat from the engine and/or generator) prior to cooling the compressor or entering the compressor. In turn, the air compressors of conventional power systems may be required to dissipate additional heat to produce the desired output. Moreover, conventional power systems may be relatively large in order to maintain the internal temperature of the power system as low as possible.

Additionally or alternatively, some conventional power systems may mount the air compressor externally to an enclosure, which exposes the air compressor to the environment and may increase repair costs or reduce the air compressor's (or the power system's) useful life. In some cases, conventional power systems provide an air intake to the air compressor from the exterior of the enclosure, which exposes the impeller or pump of the air compressor to environmental conditions such as particulate matter.

In disclosed example power systems, the air used to cool the air compressor or the welding-type power supply, or the air used as inlet air to the air compressor, is not first used to cool the engine or generator, and therefore is not preheated (or preheated as much) as in conventional power systems. Thus, the air cooling the air compressor and/or welding-type power supply is cooler than in conventional power systems, which allows for more efficient cooling of the components. Additionally, the air entering the air compressor is likewise cooler, requiring less heat dissipation by the air compressor to produce the desired result. The example power systems disclosed herein also have the air compressor within an enclosure of the power system, while still allowing the power system to be smaller relative to conventional power systems.

Figure 1:
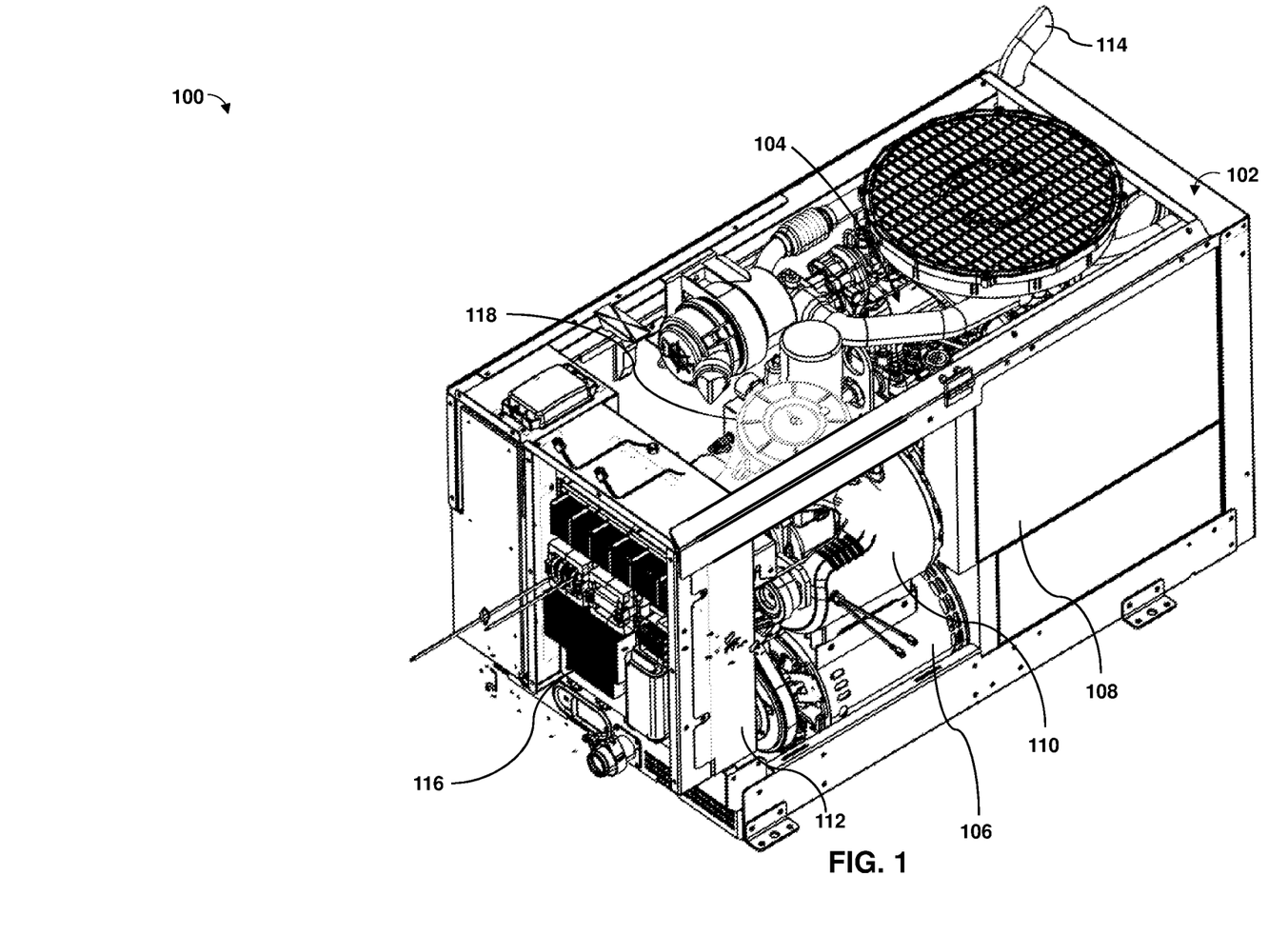
FIG. 1 is a perspective view of an example power system arranged within an enclosure, in accordance with aspects of this disclosure.

FIG. 1 is a perspective view of an example power system 100 arranged within an enclosure 102. The power system 100 may be used for various applications, such as, for example, providing compressed air, generating power, pumping, and/or welding support. As illustrated in FIG. 1, the power system 100 is within the enclosure 102. The enclosure protects the components of the power system 100 from the environment, as well as providing a safety, sound, and aesthetic barrier for an operator using or within range of the power system 100. The enclosure 102 is primarily constructed with sheet metal, and may include multiple panels. One or more of the panels may be removable and/or one or more of the panels may open to permit access.

The example power system 100 of FIG. 1 is an engine-driven power system. The system 100 includes an engine 104 that drives a generator 106 to generate electrical power. The engine 104 receives fuel from a fuel tank 108. The generator 106 provides the electrical power to an air compressor 110 and/or welding-type power supply 112. In some examples, air may enter the air compressor 110 via a manifold 118 to be pressurized by the air compressor 110.

In some examples, the welding-type power supply 112 provides one or more types of electrical power suitable for welding power. In other examples, the welding-type power supply 112 includes power conversion circuitry for other specific and/or general purpose uses, such as 110 VAC and/or 220 VAC power, battery charging power, and/or any other type of electrical power. In addition, in some examples, the power system 100 may include a muffler 114. In some such examples, the muffler 114 may function as an exhaust of the power system 100. The example power system 100 may include other components not specifically discussed herein. The components 104-112 are arranged within the enclosure 102 as described herein.

As used herein, the welding-type power supply 112 includes power conversion circuitry that refers to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

In some examples, the power system 100 includes a wind tunnel 116 to dissipate heat from the welding-type power supply 112. In other examples, the power system 100 may not include the wind tunnel 116 or the wind tunnel 116 may be configured to dissipate heat from one or more components in addition to, or as an alternative to, the welding-type power supply 112. For example, the wind tunnel 116 may dissipate heat from the compressor 110. In some examples, at least a portion of the wind tunnel 116 may define a tortuous path to remove particulates from the incoming air. In such examples, the welding-type power supply 112, air compressor 110, or one or more other components of the power system 100 may be less likely to be damaged by environmental particulates and may have a relatively long useful life. In yet other examples, other mechanisms may be used to remove particulates from the air entering the enclosure 102.

The example compressor 110 compresses air for providing a pneumatic output and/or for storage in an air storage tank. The compressor 110 obtains air via an intake manifold 118. As described in more detail below, the intake manifold 118 may obtain air from an outlet of the wind tunnel 116 to provide the compressor 110 with relatively cool and clean air.

Figure 2:
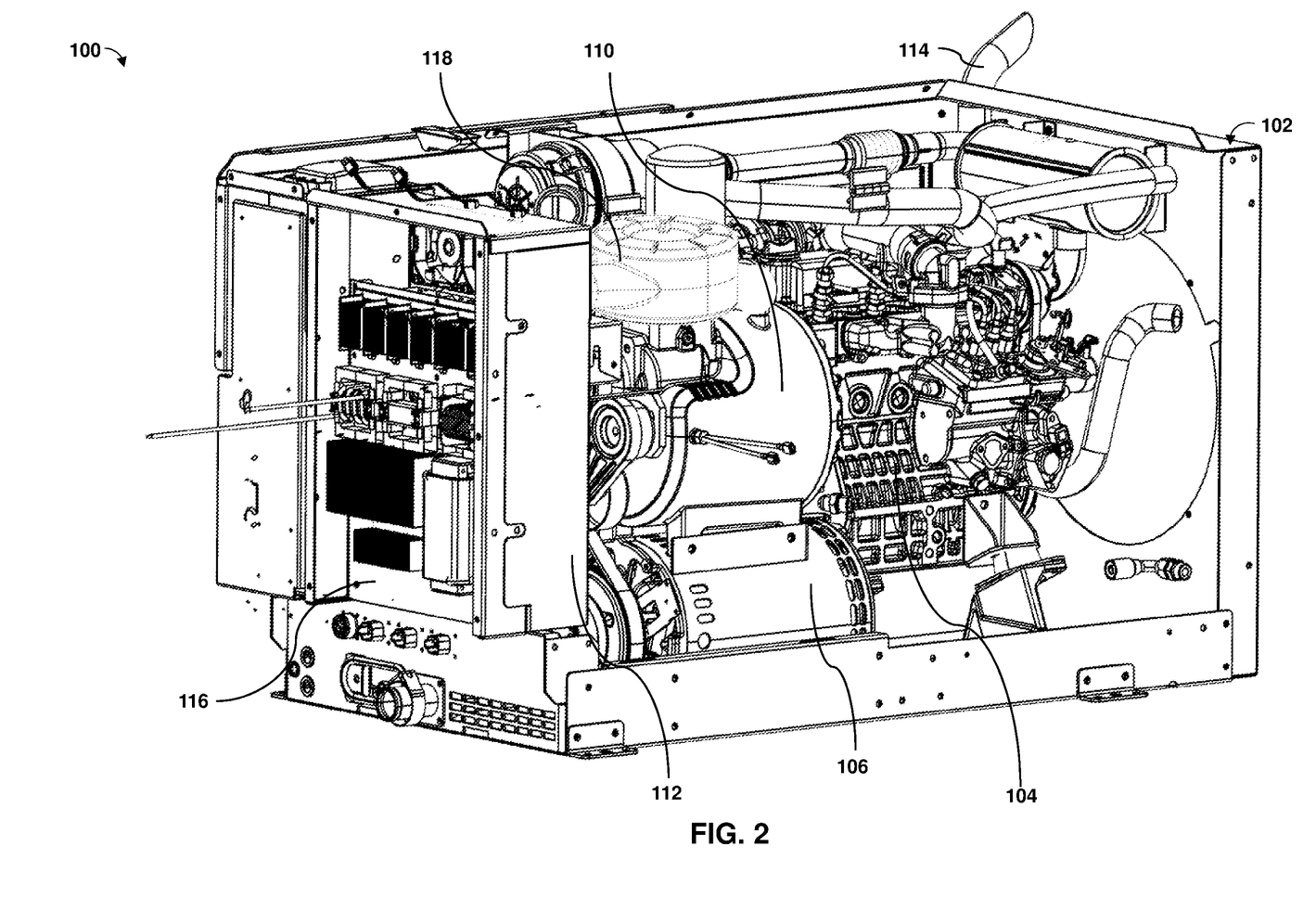
FIG. 2 is another perspective view of the example power system with selected panels of the enclosure removed.

FIG. 2 is another perspective view of the example power system 100 with selected panels of the enclosure 102 and the fuel tank 108 removed. The arrangements of the engine 104, the generator 106, the air compressor 110, welding-type power supply 112, and manifold 118 can be more easily seen in FIG. 2.

Figure 3:
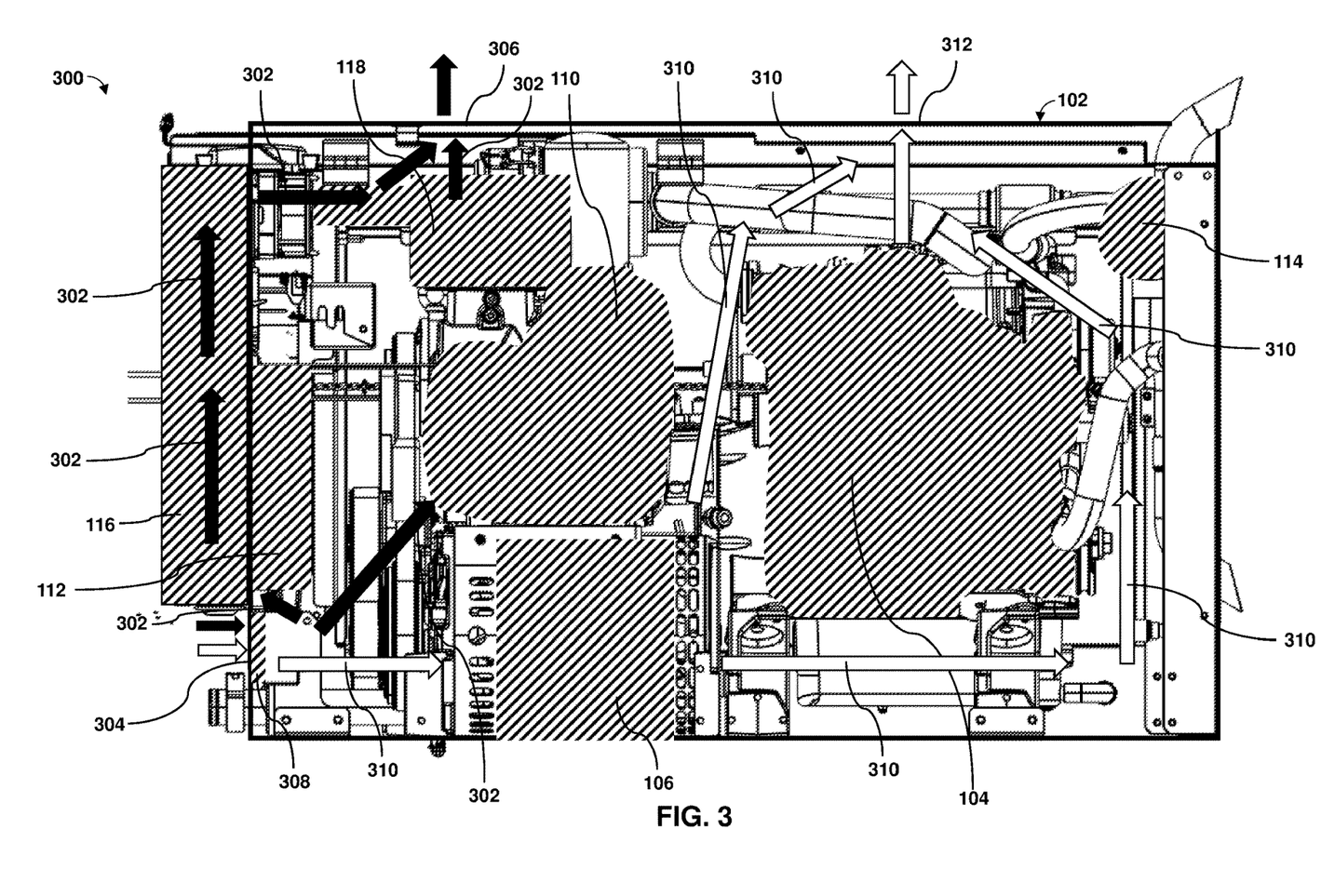
FIG. 3 is a side elevation view of an example power system, in which a first air flow path provides air to the welding power supply and the air compressor, and a second air flow path provides air to the engine, via a same intake.

FIG. 3 is a side elevation view of an example power system 300. The example power system 300 of FIG. 3 illustrates a first air routing path 302 (shown in black arrows through the enclosure 102) that improves air flow and cooling through the power system 300. The first air routing path 302 routes air from a first air inlet 304 through the interior of the enclosure 102. The first air inlet 304 is located at a first location on an exterior of the enclosure 102. The first air inlet 304 permits air intake from the exterior of the enclosure 102 to an interior of the enclosure 102. Once within the interior of the enclosure 102, the first air routing path 302 routes air from the first air inlet 304 through at least one of the welding-type power supply 112 or the air compressor 110. In the example of FIG. 3, the first air routing path 302 routes a first portion of the air from the first air inlet 304 through the air compressor 110 and a second portion of the air from the first air inlet 304 through the welding-type power supply 112.

In some examples, the first air routing path 302 is configured to route at least a portion of the air from the first air inlet 304 to cool at least one of the compressor 110 or the welding-type power supply 112. In the example of FIG. 3 for instance, the first air routing path 302 may route the air from the first air inlet 304 to cool both the compressor 110 and the welding-type power supply 112. Because the first air routing path 302 directs air to cool one or both of the compressor 110 or the welding-type power supply 112 from the first air inlet 304 (e.g., without first being used to cool other components, such as the engine 104 or generator 106), the air used to cool the compressor 110 and/or the welding-type power supply 112 is cooler than the air used to cool those components in conventional power systems. In turn, the power system 300 may cool components more efficiently than conventional power systems.

Additionally, or alternatively, in some examples, the first air routing path 302 is configured to route at least a portion of the air from the first air inlet 304 to be pressurized by the compressor 110. For example, the first air routing path 302 may route at least a portion of the air from the first air inlet 304 through the manifold 118 to be pressurized by the air compressor 110. In some such cases, less heat will need to be dissipated from the compressor 110 in the power system 300 than in conventional power systems because the air entering the compressor 110 via the first air routing path 302 is not preheated (or preheated as much) as in conventional power systems. In this way, less cooling air (or another cooling mechanism) may be needed to cool the compressor 110 in the example power systems disclosed herein as compared to conventional power systems.

In some examples, the first air routing path 302 is further configured to route at least a portion of the air from the first air inlet 304 to be released to a location external to the enclosure 102. For example, the enclosure 102 may include a first air outlet 306 to permit release of air from the interior of the enclosure 102 to the exterior of the enclosure 102. Thus, in some examples in which the first air routing path 302 is configured to route at least a portion of the air from the first air inlet 304 to be released to a location external to the enclosure 102, the first air routing path 302 may route the air to the first air outlet 306 for release externally to the enclosure 102. In some examples, the first air routing path 302 may route the air to be released externally to the enclosure after the air is used to cool one or both of the compressor 110 or the welding-type power supply 112.

In some examples, the power system 300 may include a contaminant removal mechanism. In some such examples, such as the example shown in FIG. 3, the power system 300 may include a filter 308 as a contaminant removal mechanism. The filter 308 may be configured to remove particulates from the air before the air is routed to the compressor 110 and/or the welding-type power supply 112 via the first air routing path 302. In some cases, the filter 308 may be positioned proximate the first air inlet 304 within the enclosure 102. In this way, the air may be filtered immediately upon entering the enclosure 102 via the first air inlet 304. In turn, any (or at least some) particulates in the air entering the first air inlet 304 can be removed from the air using the filter 308, which may reduce exposure of the internal components (e.g., the compressor 110 and the welding-type power supply 112) to particulates from the environment that could be harmful to (e.g., damage) the components. Therefore, the power systems described herein may be less susceptible to failure or damage from environmental particulates and have longer useful lives than conventional power systems.

In other examples, the power system 300 may include additional or alternative contaminant removal mechanisms. For example, the power system 300 may include one of more baffles. As another example, at least a portion of the first air routing path 302 may define a tortuous path, such as near the first air inlet 304, to remove particulates from the incoming air. In yet other examples, other mechanisms may be used to remove particulates from the air entering the enclosure 102 through the first air inlet 304.

In some examples, the power system 300 may include a wind tunnel 116 within the enclosure 102. In some such examples, the wind tunnel 116 may be thermally coupled to at least one of the compressor 110 or the welding-type power supply 112 and configured to cool one or both of the compressor 110 or the welding-type power supply 112. In some examples, the power supply system 300 including the wind tunnel 116 may cool the compressor 110 and/or welding-type power supply 112 more efficiently than power systems not including the wind tunnel 116. In examples in which the power system 300 includes both the filter 308 and the wind tunnel 116, the first routing air path 302 may be configured to route the air through at least one of the wind tunnel 116 or the filter 308 within the enclosure 102 before routing the air through the compressor 110 and/or the welding-type power supply 112. Additionally, or alternatively, in some cases the first air routing path 302 may be configured to route the air from the first air inlet 304 through the filter 308 to remove particulates from the air before routing the air through the wind tunnel 116. In other examples, the wind tunnel 116 may be configured to remove particulates from the incoming air. For example, as described with respect to FIG. 1, the wind tunnel 116 may include a tortuous path configured to remove environmental particulates from the air.

In some examples, the power system 300 may not include both the filter 308 and the wind tunnel 116 or the first air routing path 302 may route the air through the filter 308 and/or the wind tunnel 116 in a different order. As one example, in some cases, the first air routing path 302 may route one portion of the air through the wind tunnel 116 to cool the welding-type power supply 112 and route another portion through the filter 308 and then to the compressor 110 to be pressurized. In other examples, the power system 300 and/or first air routing path 302 may be configured in a different way.

In some examples, the power system 300 includes a second air routing path 310 (shown in outlined arrows through the enclosure 102) defined by the enclosure 102. In some such examples, the second air routing path 310 is separate from the first air routing path 302 and directs air from the first air inlet 304 through at least one of the engine 104 or the generator 106. For example, the first air routing path 302 may be configured to direct a first portion of the air from the first air inlet 304 through at least one of the compressor 110 or the welding-type power supply 112 and the second air routing path 310 may be configured to direct a second portion of the air from the first air inlet 304 through at least one of the engine 104 or the generator 106. In other examples, the second air routing path 310 may direct air from an inlet other than the first air inlet 304 (e.g., as discussed with respect to FIG. 4 below) or may direct air from multiple inlets (e.g., the first air inlet 304 and one or more other inlets).

In some cases, the second air routing path 310 is configured to route the air from the first air inlet 304 to cool at least the engine 104. In other examples, the second air routing path 310 may be configured to route the air to cool at least the generator 106. In some examples, in addition to, or as an alternative to, cooling one or both of the engine 104 or the generator 106, the second air routing path 310 may route the air to an air intake of the engine 104 (e.g., an engine fan). In some such examples, the engine 104 may be configured to use at least a portion of the air in the second air routing path 310 for combustion. In examples in which the power system 300 includes a muffler 114, the second air routing path 310 may also be configured to direct air from the first air inlet 304 to cool the muffler 114. In this way, the air routed through the second air routing path 310 may be configured to at least one of cool the engine, cool the muffler, cool the generator, or be combusted by the engine. In some examples, the second air routing path 310 may exhaust the air through a second air outlet 312. In other examples, the second air routing path 310 may exhaust the air through the first air outlet 306, another air outlet, or a combination of air outlets (e.g., both the first air outlet 306 and the second air outlet 312).

Moreover, in examples in which the enclosure 102 includes the filter 308 and/or the wind tunnel 116, the second air routing path 310 may route the air through one or both of the filter 308 or the wind tunnel 116 prior to routing the air through one or more of the engine 104, the generator 106, or the muffler 114. In other examples, the second air routing path 310 may direct the air through the engine 104, the generator 106, and/or the muffler 114 without routing the air through either of the filter 308 or the wind tunnel 116.

Figure 4:
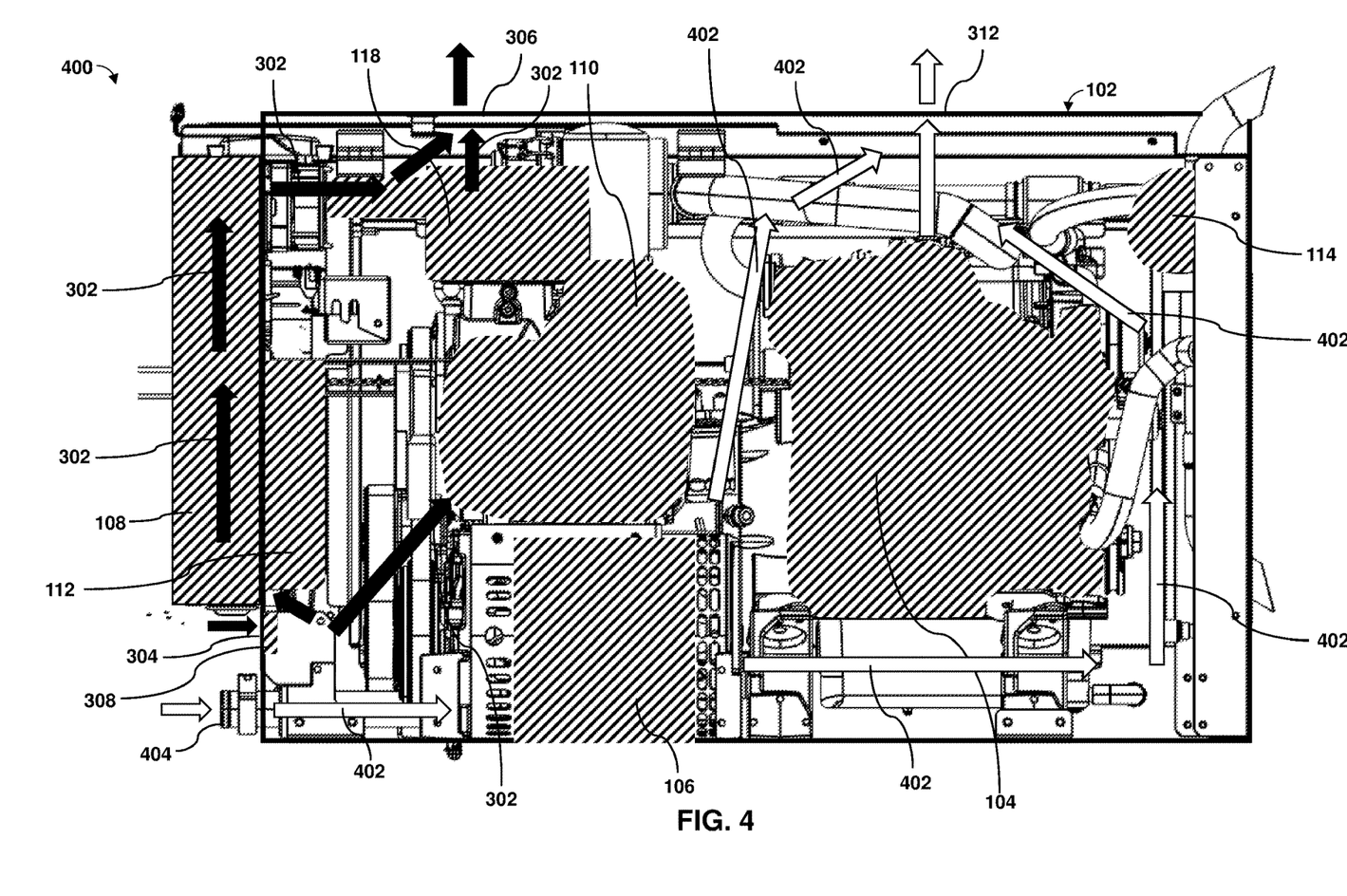
FIG. 4 is a side elevation view of another example power system, in which a first air flow path provides air to the welding power supply and the air compressor in parallel and a second air flow path provides air to the engine via a different intake.

FIG. 4 is a side view of another example power system 400. The power system 400 may be substantially the same as the power system 300 of FIG. 3. For example, the example power system 400 of FIG. 4 illustrates the first air routing path 302 (shown in black arrows through the enclosure 102) of the power system 300 of FIG. 3. However, the example power system 400 illustrated in FIG. 4 includes a second air routing path 402 that is configured to route air from a second air inlet 404 that is at a different location that the first air inlet 304.

In some examples, the second air inlet 404 is located at a second location different than the first location (e.g., of the first air inlet 304) on the exterior of the enclosure 102 to permit intake of air from the exterior of the enclosure 102 to the interior of the enclosure 102. In this way, the first air routing path 302 may be configured to route air from the first air inlet 302 and the second air routing path 402 may be configured to route air from the second air inlet 404. In some examples, the first air inlet 304 may be separated from the second air inlet 404 within the enclosure 102. As one example, the first air inlet 304 may be separated from the second air inlet 404 by a separation barrier within the enclosure 102 in some cases.

The second air routing path 404 may be the same or substantially the same as the second air routing path 310 of FIG. 3 in other respects (e.g., other than where the air is directed from). For example, the air routed through the second air routing path 404 may be configured to at least one of cool the engine, cool the muffler, cool the generator, or be combusted by the engine. In some examples, power systems having a first air inlet 304 and a second air inlet 404 may provide for better separation between the first air routing path 302 and the second air routing path 404, which may increase the efficiency of the cooling air. Additionally, or alternatively, routing air from the first air inlet 304 via the first air routing path 302 and routing air from the second air inlet 404 via the second air routing path 402 may enable more air to be directed through each of the routing paths (e.g., in comparison to diverting a portion of the air from the first air inlet 302 through each of the first air routing path 302 and the second air routing path 310), which may also increase the efficiency of the power system 400.

Figure 5:
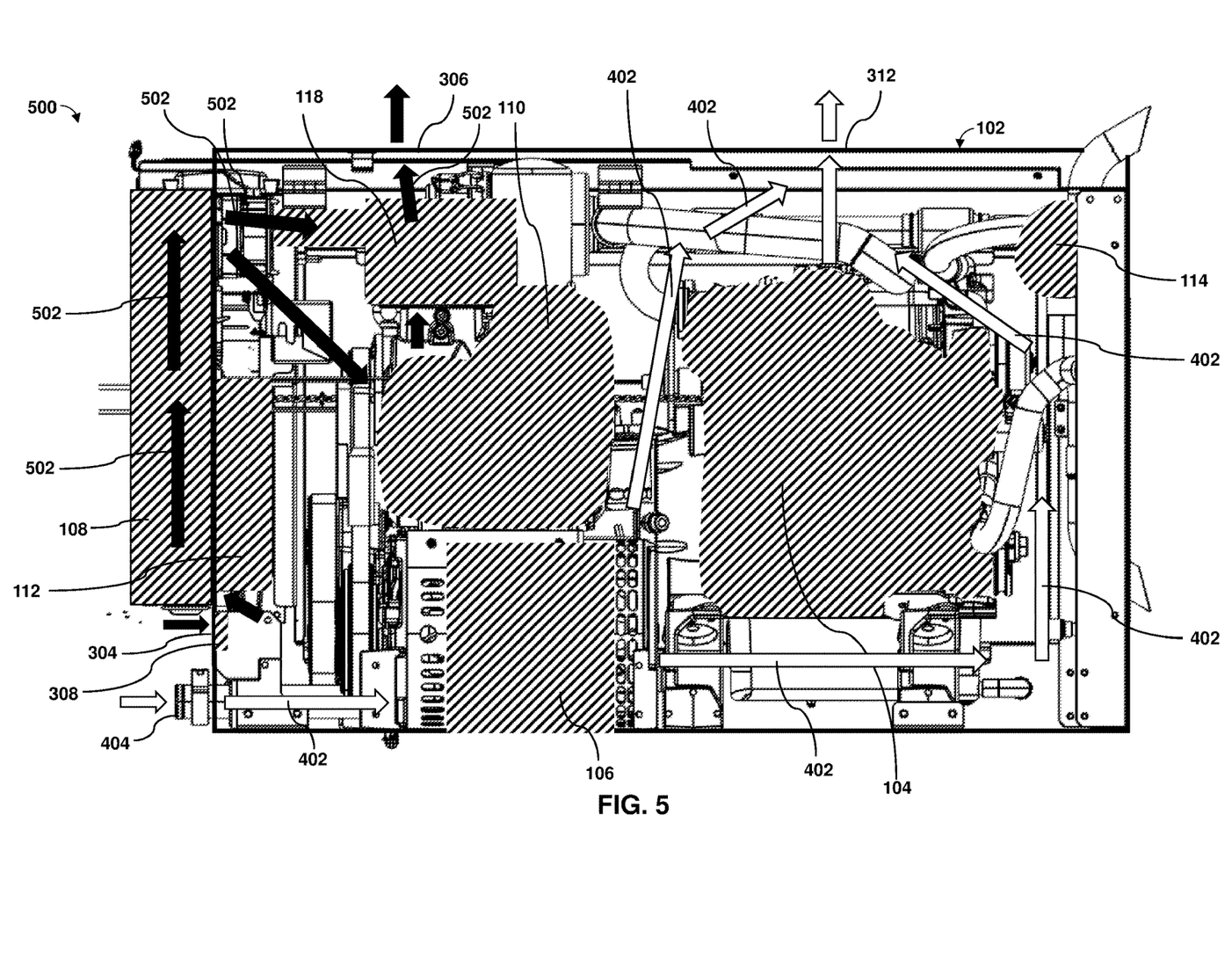
FIG. 5 is a side elevation view of yet another example power system, in which the air flow path provides air to the welding power supply and then to the air compressor.

FIG. 5 is a side view of yet another example power system 500. The power system 500 may be substantially the same as the power system 300 of FIG. 3 or the power system 400 of FIG. 4. For example, the power system 500 of FIG. 5 may include the second air routing path 310 of FIG. 3 configured to direct air from the first air inlet 304 to one or more of the engine 104, the generator 106, or the muffler 114, or the power system 500 may include the second air routing path 402 of FIG. 4 configured to direct air from the second air inlet 404 to one or more of the engine 104, generator 106, or muffler 114.

The example power system 500 of FIG. 5 includes a first air routing path 502 different than the first air routing path 302 of FIGS. 3 and 4. For example, the first air routing path 502 of FIG. 5 is configured to route air from the first air inlet 304 through the components (e.g., the compressor 110 and the welding-type power supply 112) of the power system 500 in a particular order. In some examples, the first air routing path 502 is configured to route air, in order, from the first air inlet 304 through the welding-type power supply 112 and then through the compressor 110. Such a configuration may enable the air from the first air inlet 304 to be used to cool the welding-type power supply 112 before being used to cool the compressor 110 or being pressurized by the compressor 110 without the air becoming significantly preheated (e.g., as may be the case with conventional power systems).

In examples in which the power system 500 includes a wind tunnel 116, the first air routing path 502 may route the air, in order, from the first air inlet 304 to the wind tunnel 116 thermally coupled to the welding-type power supply 112, and from the wind tunnel 116 to the to the compressor 110. For example, the first air routing path 502 may route the air from the wind tunnel 116 to the compressor 110 via the manifold 118. Similarly, in examples in which the power system 500 includes a filter 308, the first air routing path 502 may direct the air from the first air inlet 304 through the different components (e.g., the compressor 110, the welding-type power supply 112, the wind tunnel 116, the manifold 118, and/or the filter 308) in a specific order. For example, the first air routing path 502 may route the air from the first air inlet 304 through the filter 308 to remove particulates form the air, from the filter 308 to the wind tunnel 116 thermally coupled to the welding-type power supply 112, and from the wind tunnel 116 to the compressor 110 (e.g., via the manifold 118). In other examples, the first air routing path 502 may not route the air through both the filter 308 and the wind tunnel 116. For example, the first air routing path 502 may not route the air through both the filter 308 and the wind tunnel 116 in examples in which the power system 500 does not include a wind tunnel 116. In such cases, the first air routing path 502 may be configured to route the air from the first air inlet 304 through the filter 308 to remove particulates form the air, and then from the filter 308 to the compressor 110.

In examples in which the first air routing path 502 is configured to direct the air from the first air inlet 304 in a particular order, the use of the air from the first air inlet 304 may be more efficient or optimized in achieving desired results, such as cooling the components and/or pressurizing the air. In other examples, however, different configurations (such as the configuration of the first air routing path 302 of FIG. 3) may be the most efficient configuration for a particular power system.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed.

What is claimed is:

1. A power system comprising:
   a welding-type power supply, a compressor, an engine, a generator, and an enclosure;
   a first air inlet at a first location on an exterior of the enclosure to permit intake of air from the exterior of the enclosure to an interior of the enclosure;
   a first air routing path defined by the enclosure to direct the air from the first air inlet through:
   the welding-type power supply, and
   the compressor;
   a first air outlet for release of the air from the first air routing path;
   a second air routing path, separate from the first air routing path, and defined by the enclosure to direct the air from the first air inlet or a second air inlet through at least one of the engine or the generator; and
   a second air outlet, separate from the first air outlet, for release of the air from the second air routing path.

2. The power system as defined in claim 1, wherein the first air routing path is configured to route at least a portion of the air to cool at least one of the welding-type power supply or the compressor.

3. The power system as defined in claim 1, wherein the first air routing path is configured to route at least a portion of the air to be pressurized by the compressor.

4. The power system as defined in claim 1, wherein the first air routing path is configured to route at least a portion of the air to be released to a location external to the enclosure.

5. The power system as defined in claim 1, wherein the enclosure further comprises a wind tunnel.

6. The power system as defined in claim 1, wherein the enclosure further comprises a filter configured to remove particulates from the air from the first air inlet.

7. The power system as defined in claim 1, wherein the first air routing path is configured to route the air through at least one of a wind tunnel or a filter within the enclosure before routing the air through the compressor.

8. The power system as defined in claim 1, wherein the first air routing path is configured to direct the air from the first air inlet through, in order, the welding-type power supply and the compressor.

9. The power system defined in claim 1, wherein the first air routing path is configured to direct a first portion of the air from the first air inlet through at least one of the welding-type power supply or the compressor, and wherein the second air routing path is configured to direct a second portion of the air from the first air inlet through at least one of the engine or generator.

10. The power system as defined in claim 1, wherein the second air inlet is at a second location different than the first location on the exterior of the enclosure to permit intake of air from the exterior of the enclosure to the interior of the enclosure, wherein the first air routing path is configured to route the air from the first air inlet and the second air routing path is configured to route the air from the second air inlet.

11. The power system as defined in claim 1, wherein the second air routing path is configured to route the air to cool at least the engine.

12. The power system as defined in claim 1, wherein the second air routing path is configured to route the air to an air intake of the engine, wherein the engine is configured to use at least a portion of the air in the second air routing path for combustion.

13. The power system as defined in claim 1, further comprising a separation barrier within the enclosure, the separation barrier separating the first air inlet from the second air inlet.

14. A power system comprising:
a welding-type power supply, a compressor, an engine, a generator, a muffler, and an enclosure;
a first air inlet at a first location on an exterior of the enclosure to permit intake of air from the exterior of the enclosure to an interior of the enclosure;
a second air inlet at a second location different than the first location on the exterior of the enclosure to permit intake of air from the exterior of the enclosure to the interior of the enclosure;
a first air routing path to direct the air from the first air inlet to the compressor and the welding-type power supply;
a second air routing path to direct the air from the second air inlet to at least one of the engine, the muffler, or the generator;
a first air outlet for release of air from the first air routing path; and
a second air outlet, separate from the first air outlet, for the release of air from the second air routing path.

15. The power system defined in claim 14, wherein the air from the first air inlet is separated in the enclosure from the air from the second air inlet.

16. The power system defined in claim 14, wherein the air routed through the first air routing path is configured to at least one of cool the welding-type power supply, cool the compressor, be compressed by the compressor, or be released outside of the enclosure.

17. The power system defined in claim 14, wherein the air routed through the second air routing path is configured to at least one of cool the engine, cool the muffler, cool the generator, or be combusted by the engine.

18. The power system defined in claim 14, further comprising a filter configured to remove the particulates from at least the air from the first air inlet before being routed to the welding-type power supply or the compressor via the first air routing path.

19. The power system defined in claim 14, wherein the first air routing path routes the air, in order:
from the first air inlet to a wind tunnel thermally coupled to the welding-type power supply; and
from the wind tunnel to the compressor.

20. The power system defined in claim 14, wherein the first air routing path routes the air, in order:
from the first air inlet to a filter, wherein the filter is configured to remove particulates from the air from the first air inlet;
from the filter to a wind tunnel of the welding-type power supply; and
from the wind tunnel to the compressor.

* * * * *